United States Patent
Mekhiel

(10) Patent No.: US 8,914,612 B2
(45) Date of Patent: Dec. 16, 2014

(54) DATA PROCESSING WITH TIME-BASED MEMORY ACCESS

(75) Inventor: Nagi N. Mekhiel, Markham (CA)

(73) Assignee: Conversant Intellectual Property Management Inc., Ottawa (CA)

( * ) Notice: Subject to any disclaimer, the term of this patent is extended or adjusted under 35 U.S.C. 154(b) by 1909 days.

(21) Appl. No.: 11/978,529

(22) Filed: Oct. 29, 2007

(65) Prior Publication Data

US 2009/0113159 A1 Apr. 30, 2009

(51) Int. Cl.
*G06F 13/00* (2006.01)
*G06F 12/06* (2006.01)

(52) U.S. Cl.
CPC ........ *G06F 12/06* (2013.01); *G06F 2212/1016* (2013.01)
USPC ............................ 711/218; 711/219; 711/167

(58) Field of Classification Search
USPC .......................................... 711/167, 217–219
See application file for complete search history.

(56) References Cited

U.S. PATENT DOCUMENTS

| | | | |
|---|---|---|---|
| 4,282,572 A | 8/1981 | Moore, III et al. | |
| 4,757,477 A | 7/1988 | Nagayama et al. | |
| 4,787,065 A * | 11/1988 | Barazesh et al. | 711/219 |
| 5,440,698 A | 8/1995 | Sindhu et al. | |
| 5,463,749 A * | 10/1995 | Wertheizer et al. | 711/110 |
| 5,822,776 A * | 10/1998 | De Korte et al. | 711/167 |
| 6,295,571 B1 | 9/2001 | Scardamalia et al. | |
| 6,467,011 B2 | 10/2002 | Scardamalia et al. | |
| 6,519,672 B2 | 2/2003 | Scardamalia et al. | |
| 6,629,223 B2 | 9/2003 | Bachot et al. | |
| 6,769,047 B2 | 7/2004 | Kurupati | |
| 6,868,486 B1 * | 3/2005 | Ward | 711/158 |
| 6,963,327 B2 | 11/2005 | Kawahata et al. | |
| 7,035,985 B2 | 4/2006 | Bachot et al. | |
| 7,055,005 B2 | 5/2006 | Walker et al. | |
| 7,089,339 B2 | 8/2006 | Falik et al. | |
| 2003/0023829 A1 * | 1/2003 | Ishii | 711/219 |
| 2004/0199728 A1 * | 10/2004 | Walker et al. | 711/138 |
| 2005/0007848 A1 | 1/2005 | Shirley | |
| 2007/0038817 A1 | 2/2007 | Vierthaler et al. | |

FOREIGN PATENT DOCUMENTS

WO     WO 00/54159 A1     9/2000
WO     WO 03/041119 A2    5/2003

OTHER PUBLICATIONS

PCT International Search Report for PCT Application No. PCT/CA2008/001894, dated Mar. 2, 2009.

* cited by examiner

*Primary Examiner* — Sean D Rossiter
(74) *Attorney, Agent, or Firm* — Daniel Hammond

(57) ABSTRACT

Memory access in data processing is provided using a time-based technique in which memory locations are mapped to respectively corresponding periods of time during which they are made available for access.

35 Claims, 18 Drawing Sheets

DATA PROCESSING WITH TIME-BASED MEMORY ACCESS

FIELD OF THE INVENTION

The invention relates generally to data processing and, more particularly, to memory access during data processing.

BACKGROUND OF THE INVENTION

The performance of a data processing system depends in large measure on its memory design. Due to the typically large operating speed differential between the data processor and the memory, the data processor in many conventional data processing systems may spend 80% of its operating time waiting for memory accesses. Many conventional systems attempt to close the speed gap by using large multi-level cache arrangements. However, frequent cache misses increase the processor demand for accessing the slow memory, and the use of cache can increase the data transfer time involved in memory accesses. Also, the number of cache misses increases with the length of the data processing application, thus causing a proportional increase in the time that is spent accessing memory.

Some conventional data processing systems use multiple processors (sometimes contained within a single chip) in combination with shared memory, to improve performance in parallel applications. However, the shared memory requires synchronization overhead. This synchronization overhead, together with the relatively slow memory operation mentioned above, can limit performance gains and scalability in multiprocessor arrangements. The limitations of synchronization overhead and slow memory operation also hamper performance and scalability in conventional multi-threading systems (which use a single processor capable of executing parallel threads).

It is desirable in view of the foregoing to provide solutions that can alleviate the aforementioned problems associated with conventional data processing systems.

DETAILED DESCRIPTION

Example embodiments of the invention make all memory locations cyclically available to the data processor(s). The data processor waits to receive access to each memory location at a respectively associated time. There is no need for synchronization among multiple processors because the access time for any specific location is already known to all processors. Some embodiments make memory locations available to all processors using a shared bus so that processors need not to arbitrate and compete for accessing one shared resource. In some embodiments, every location in the memory is delivered to the bus, and each processor will have received access to all desired memory locations after waiting no longer than the time required to access the entire memory. All of the memory may be made available to each processor, whether or not the processor needs it.

Figure 1A:
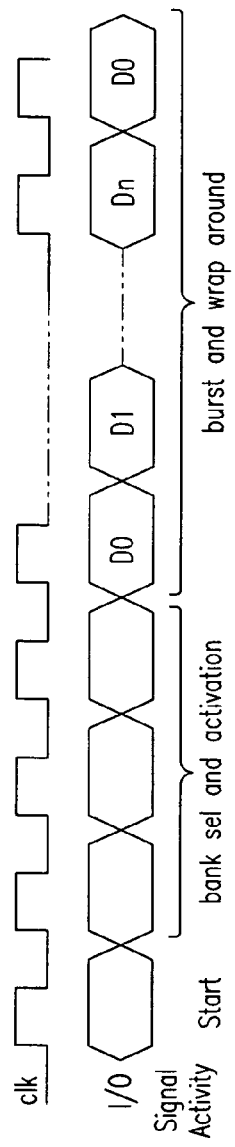
FIG. 1A is a timing diagram associated with operations of the data processing system of FIG. 1 according to example embodiments of the invention.
Figure 1:
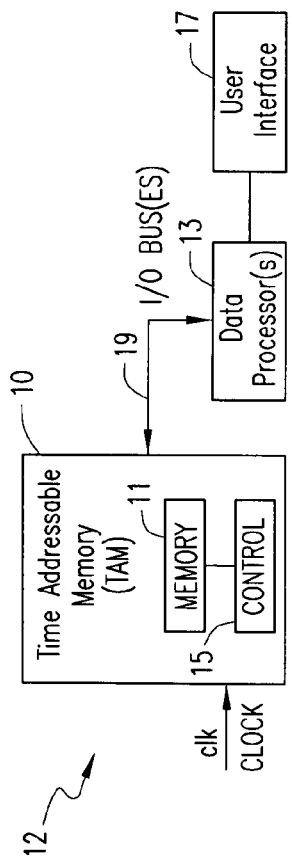
FIG. 1 diagrammatically illustrates a data processing system according to example embodiments of the invention.

FIG. 1 diagrammatically illustrates a data processing system 12 according to example embodiments of the invention. In various example embodiments, the data processing system 12 is a desktop computer, a personal computer, a portable computer, a laptop computer, or a mobile telephone. The data processing system includes a time addressable memory (TAM) apparatus 10 having a clock input (clk) and one or more I/O buses 19 to transfer read/write data between a memory 11 within the apparatus 10 and one or more data processors 13. A memory controller 15 controls access to the memory 11. The apparatus 10 is also referred to herein as a TAM unit. In some embodiments, the data processing system uses a TAM apparatus that includes a plurality of instances of the TAM unit 10. A user interface (e.g., tactile and/or video and/or audio) 17 permits a user to access one or more of the data processors. With respect to the memory 11, various embodiments use DRAM technology, SRAM technology, and other memory technologies, including memory structures other than arrays. Various further example embodiments of the data processing system of FIG. 1 are described hereinbelow with respect to FIGS. 2-17.

As shown in FIG. 1A, in some embodiments, the first memory location access (to memory location D0) on the I/O bus occurs after a Start signal and bank selection and activation signaling. Thereafter, during each clock cycle, the content of a respectively corresponding memory location is accessed so that data (or program instruction information) can be read from or written to that location. Each memory location is accessed during its corresponding clock cycle in a serial burst, progressing sequentially through the last memory location Dn. After the last location Dn has been accessed, the first location D0 is accessed next, and the memory access process continues in a continually repeating (cyclic) sequence of memory location accesses. Thus, during read operation, the content of the memory "spins" around constantly on the I/O bus. The broken lines in FIG. 1A represent clock cycles and I/O bus intervals that are not explicitly shown.

Figure 2:
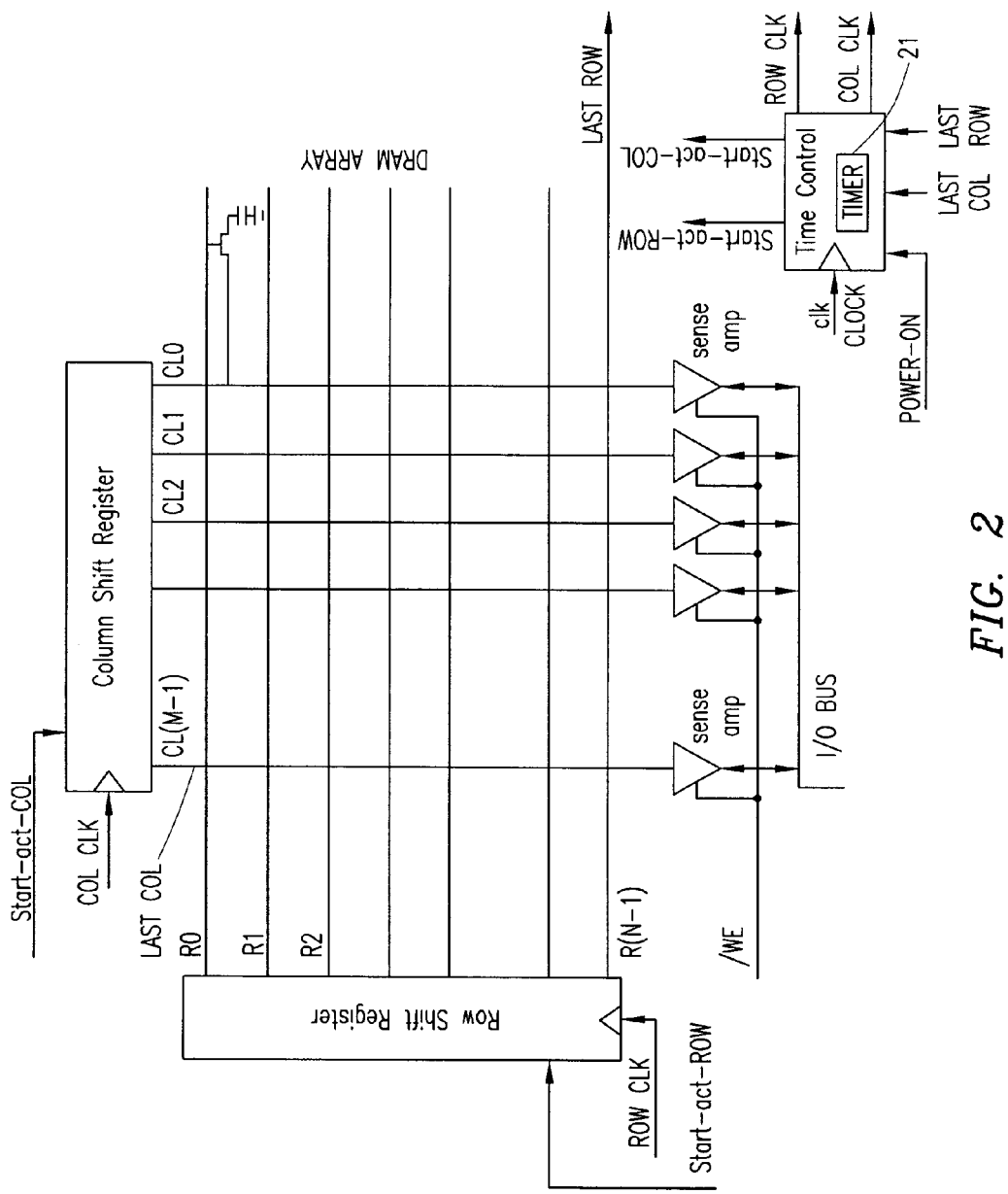
FIG. 2 diagrammatically illustrates a portion of FIG. 1 in more detail according to example embodiments of the invention.

FIG. 2 diagrammatically illustrates the TAM unit of FIG. 1 in more detail according to example embodiments of the invention. The memory in the apparatus of FIG. 2 is a conventional DRAM array organized as an array of N rows by M columns. Each DRAM cell is located at the intersection of a specific row and a specific column. Each cell includes a capacitor and a transistor as is conventional in DRAM structures. FIG. 2 also illustrates the memory controller of FIG. 1 in more detail according to example embodiments of the invention. In particular, the controller includes the following:

Row Shift Register

The Row shift register has N outputs, R0-R(N-1), each of which is responsible to activate the corresponding DRAM row similar to the row decoder outputs in conventional DRAM architectures. In some embodiments, the Row shift register uses N serially connected D-type Flip Flops that are commonly clocked by a ROW CLK signal. The output R(N-1) is also referred to herein as the LAST ROW signal, as shown in FIG. 2.

Column Shift Register

The Column shift register has M outputs, CL0-CL(M-1), corresponding to respective DRAM column selections. This allows column selection similar to that performed by the column decoder outputs in conventional DRAM architectures. In some embodiments, the Column shift register uses M serially connected D-type Flip Flops that are commonly clocked by a COL CLK signal. The output CL(M-1) is also referred to herein as the LAST COL signal, as shown in FIG. 2.

Time Control Unit

The Time control unit implements a state machine (described below with respect to FIG. 5) to provide the following signals:

Start-act-ROW: This causes the first D Flip-Flop of the Row Shift Register to activate the first row of the DRAM array upon the next pulse of ROW CLK.

ROW CLK: Clock for the Row Shift Register. The period of this clock defines the length of time for the row to stay active. Each clock period, the Row Shift Register activates the next row by shifting the content of the currently active D Flip-Flop to the next D Flip-Flop in the Row Shift Register.

Start-act-COL: This causes the first D Flip-Flop of the Column Shift Register to activate the first column of the DRAM array upon the next pulse of COL CLK.

COL CLK: Clock for the Column Shift Register. The period of this clock defines the length of time for the column to stay active. Each clock period, the Column Shift Register activates the next column by shifting the content of the currently active D Flip-Flop to the next D Flip-Flop.

Also shown in FIG. 2 are sense amplifiers that interface between the DRAM array and an I/O bus, as in conventional DRAM architectures. The direction of data flow is controlled by a read/write enable signal (designated "/WE" in FIG. 2), as in conventional DRAM architectures. The sense amplifiers work as fast latches for the data as in conventional DRAM architectures. When the signal /WE is active, the latches of the sense amplifiers are updated with write data from the I/O bus. For memory reads, /WE is inactive and the sense amplifiers latch transfer data from the DRAM array to the I/O bus.

Figure 3:
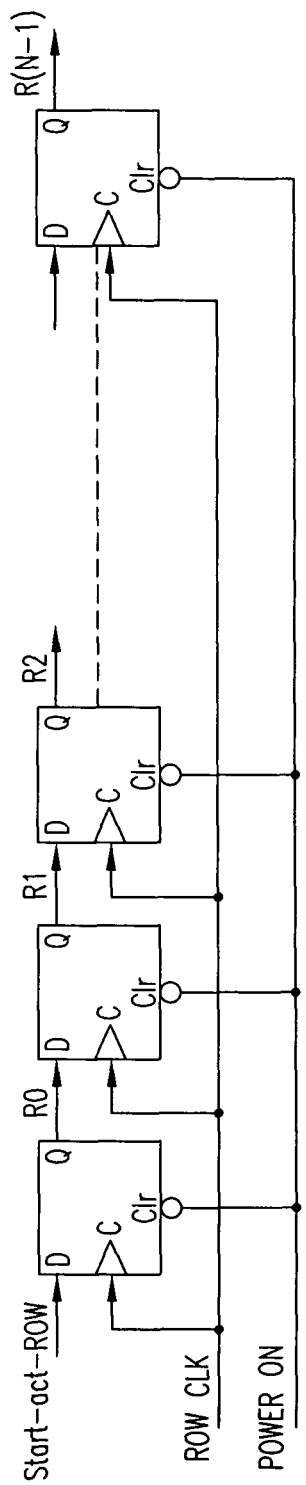
FIG. 3 diagrammatically illustrates a portion of FIG. 2 in more detail according to example embodiments of the invention.

FIG. 3 diagrammatically illustrates the Row Shift Register of FIG. 2 in more detail according to example embodiments of the invention. This shift register shifts its content from R0 to R(N-1). Every cycle of ROW CLK activates the Flip Flop output that corresponds to the next row of the DRAM array. There are N series-connected D Flip-Flops, all clocked by ROW CLK. When POWER ON occurs, all of the Flip Flops are cleared to 0. The D input of Flip Flop R0 is connected to Start-act-ROW, which becomes active to initiate activation of the first row in the memory array, and becomes active again after all memory locations have been accessed (described below with respect to FIG. 5), in order to repeat the sequence of memory location accesses. The broken line in FIG. 3 represents D Flip Flops that are not explicitly shown.

Figure 4:
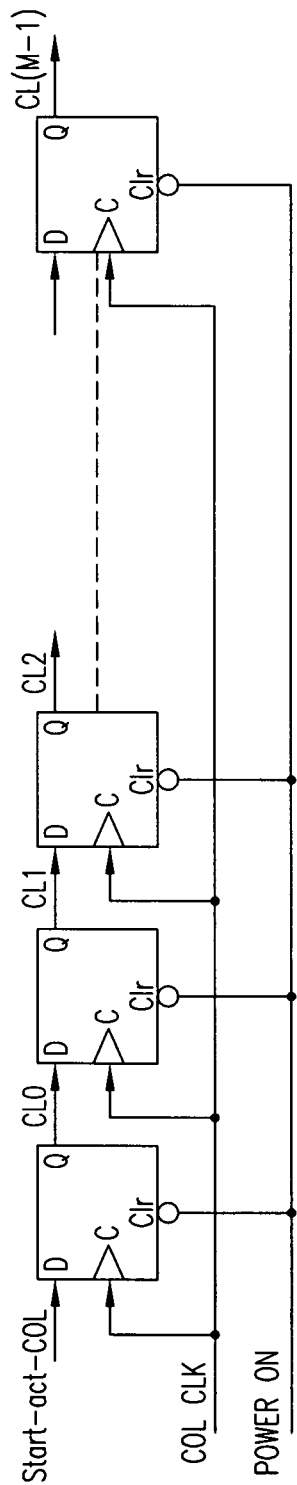
FIG. 4 diagrammatically illustrates a portion of FIG. 2 in more detail according to example embodiments of the invention.

FIG. 4 diagrammatically illustrates the Column Shift Register of FIG. 2 in more detail according to example embodiments of the invention. This shift register shifts its content from CL0 to CL(M-1). Every cycle of COL CLK activates the Flip Flop output that corresponds to the next column of the DRAM array. There are M series-connected D Flip-Flops, all clocked by COL CLK. When POWER ON occurs, all of the Flip Flops are cleared to 0. Flip Flop CL0 has its D input connected to Start-act-COL, which becomes active to initiate activation of the first column in the memory array. After activation of Start-act-COL, every cycle of COL CLK activates the next Flip Flop output to enable access to the next column in the currently accessed row of the memory array. After activation of the current row, Start-act-COL becomes active to enable access to the first column of that row. Start-act-COL becomes active again after the last column is accessed (described below with respect to FIG. 5) in order to repeat the sequence of memory location accesses for next row. The broken line in FIG. 4 represents D Flip Flops that are not explicitly shown.

Figure 5:
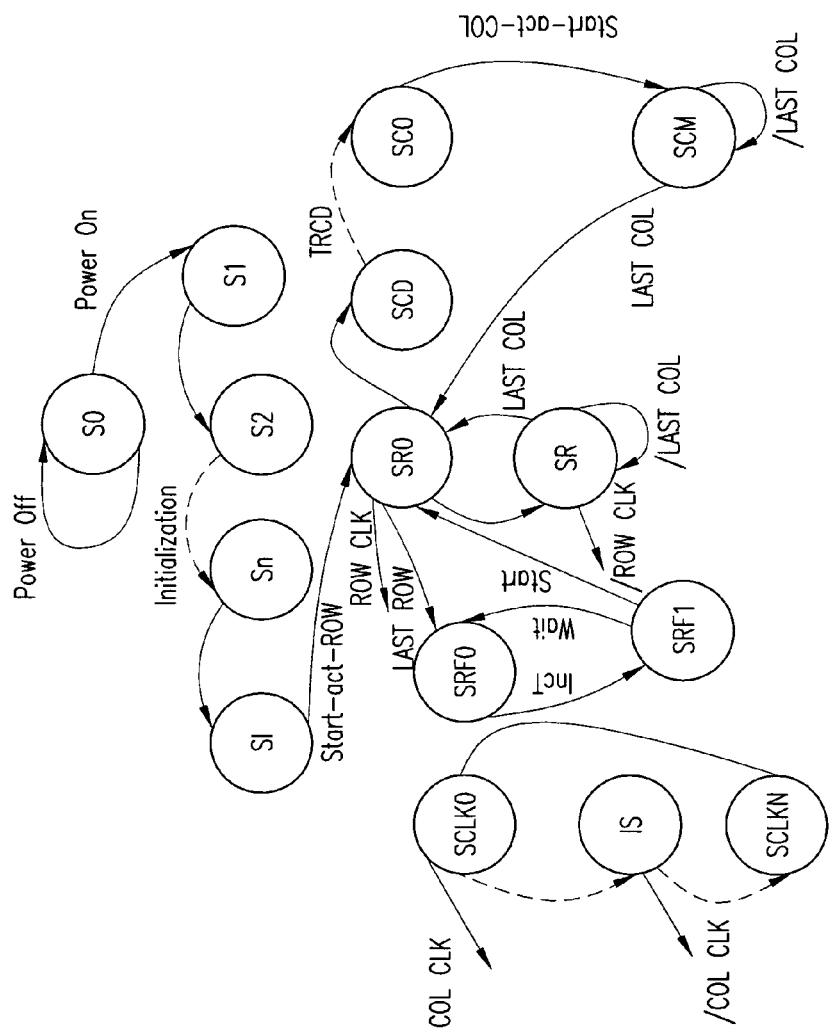
FIG. 5 is a state diagram associated with operations performed by a portion of FIG. 2 according to example embodiments of the invention.

FIG. 5 is a state diagram of a state machine implemented by the Time Control Unit of FIG. 2 according to example embodiments of the invention. In some embodiments, the state machine is responsible for the following:

Waiting for Power On

In state S0, the state machine waits for the Power On signal to start from power off condition.

Initialization

When the Power On signal becomes active, an initialization process (states S0-Sn) is executed, as with conventional DRAM operation. The broken line between state S2 and state Sn represents states that are not explicitly shown.

Row Access

After the initialization states, the state machine advances to state SI, performs the initial activation of Start-act-Row, and advances to state SR0. When Start-act-Row becomes active, the ROW CLK voltage level is taken high for one clock cycle in state SR0. Then, in the next state SR, the ROW CLK level is taken low. This generates a full ROW CLK cycle, which occurs while the input of flip-flop R0 has its D input=1 by virtue of its connection to the Start-act-Row signal (see also FIGS. 2 and 3). At state SR0, the Q output of flip flop R0, which is connected to Row 0, goes active (logic 1 in this example) in response to the high level on ROW CLK, and thereby activates Row 0 of the memory array. The state machine waits in state SR, until the end of accessing all columns in the activated row. The LAST COL signal is provided by the flip-flop output CL(M-1) (see also FIG. 2). When LAST COL becomes active, the state machine goes back to state SR0 to start the next row activation. In state SR0, the state machine makes ROW CLK high, which causes the Row Shift Register to shift the logic 1 from flip flop R0 (or whatever flip flop currently holds logic 1) to flip flop R1 (or whatever is the next flip flop) to activate the next row of memory. The row access operations described above are repeated for all rows of memory. State SRO detects when the last column of the last row has been accessed, and activates Start-act-Row again in response, in order to repeat the entire memory access process.

Generating COL CLK

The state machine is used to divide the frequency of the main clock signal (see clk in FIG. 2) to generate COL CLK, whose cycle time depends on the speed of the DRAM. The speed is determined by the minimum time needed to transfer data in or out of the sense amplifiers. In state SCLK0, the state machine makes COL CLK high, then assumes one or more intermediate states "IS" (shown by broken line in FIG. 5) in which it makes COL CLK low, and then goes to state SCLKN in which COL CLK is taken high again to complete the full COL CLK cycle. From state SCLKN, the state machine goes back to SCLK0 to start the next COL CLK cycle.

Column Access

When Start-act-Row initially becomes active, the state machine (as described above) assumes state SR0 to make the first row active for row access. The state machine also implements state SCD to begin the column accesses for the currently accessed row. In some embodiments, the column access process first goes through a number of states (designated by broken line in FIG. 5) to allow for TRCD before activating the first column in the active row. After waiting for TRCD, the state machine goes to state SC0 and generates Start-act-COL, which is connected to the input of flip flop CL0 in the Column Shift Register (see also FIGS. 2 and 4). The COL CLK is also being generated (in SCLK0-SCLKN), and on its rising edge, the Q output of flip-flop CL0 will go to logic 1. This activates access to the first column C0 in the current row. With the activation of Start-act-Col, the state machine assumes state SCM, in which the Column shift register shifts the logic 1 with each cycle of COL CLK. This sequentially activates each next column until the logic 1 reaches flip flop CL(M-1), which controls access to the last column. When the CL(M-1) output, also referred to as the LAST COL signal, becomes logic 1, the state machine responds by assuming state SR0 to start the next row activation.

With a specific row and a specific column activated as specified above, the /WE signal controls the direction of data flow through the associated sense amplifier to or from the I/O bus. In a READ operation, /WE is kept high during column access time, and the data flows from the sense amplifier to the I/O bus. In a WRITE operation the /WE signal is asserted low during column access time, and data from the I/O bus is written to the sense amplifier latch. The timing of the READ/WRITE operation depends on the DRAM speed as in conventional DRAM read or write operations.

In some embodiments, refresh is provided by exploiting the cyclic nature of accessing all of the DRAM rows in sequence. The time control unit (see FIG. 2) implements a refresh control function that monitors the time that it takes from the start of activating the first row until the activation of the last row. The Start-act-ROW signal starts a row activation timer 21 (FIG. 2), and the LAST ROW signal stops the row activation timer. The row activation timer cycles between SRF0 and SRF1 and increments (Inc T) the row activation timer 21 until activation of the LAST ROW signal. When the LAST ROW signal is received, the content of the row activation timer 21 is compared with the maximum refresh time. If the row activation time is equal to or exceeds the maximum refresh time, the state machine advances from state SRF1 to state SR0 and starts activating all the rows in the manner described above, thereby to refresh the DRAM cells. If the row activation time is less than the maximum refresh time, no row activation is needed. The cyclic nature of the TAM apparatus is thus used to hide the refresh overhead. Other embodiments use conventional refresh operations.

Figure 6:
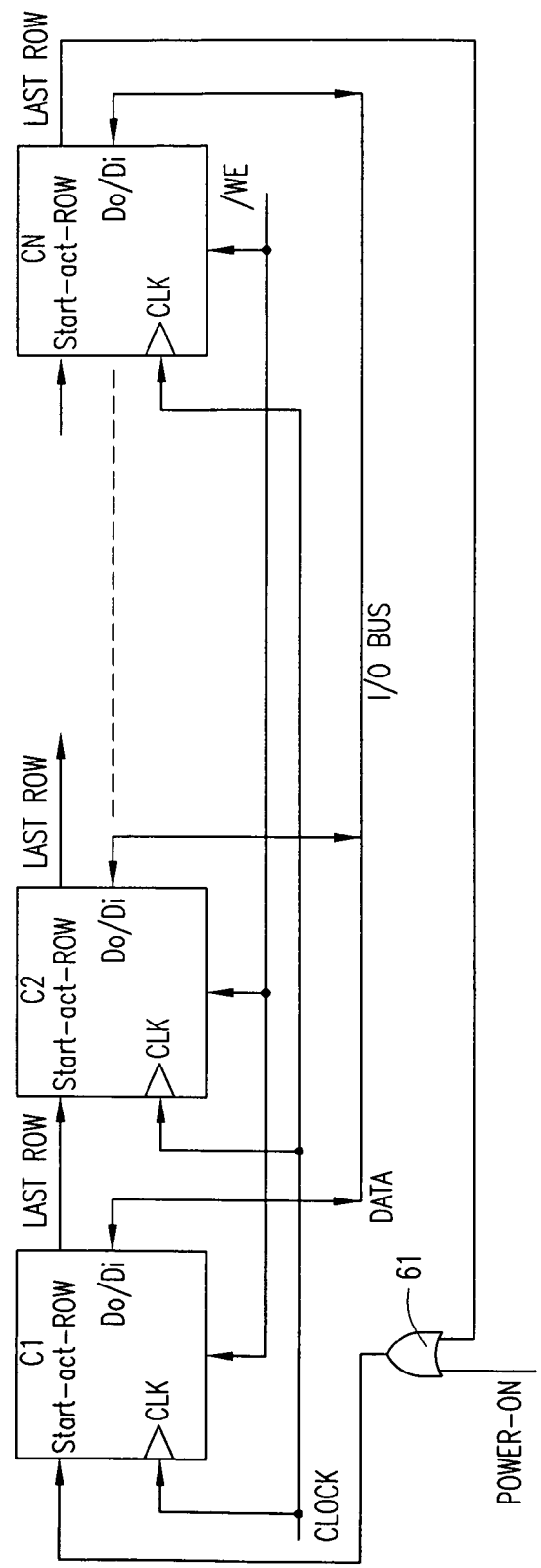
FIG. 6 diagrammatically illustrates a portion of FIG. 1 in more detail according to example embodiments of the invention.

FIG. 6 diagrammatically illustrates a TAM apparatus that uses multiple TAM chips according to example embodiments of the invention. The apparatus of FIG. 6 includes N TAM chips C1-CN connected in serial fashion such that the first memory location of the apparatus is the first location of the first chip C1, and the last memory location of the apparatus is the last location of the last chip CN. In some embodiments, each of the TAM chips includes a TAM unit as described above with respect to FIGS. 1-5, except the LAST ROW signal of each TAM unit is used to drive the Start-act-Row signal of the TAM unit of the next chip in the series. After the LAST ROW signal from a previous chip activates the Start-act-Row signal of a current chip, a counter (not explicitly shown) in the current chip determines when the last column of the last row of the previous chip has been accessed, after which the first column of the first row of the current chip is accessed in the manner described above. After the access of the last location of the last chip CN, the access of the first location of the first chip C1 occurs by virtue of the LAST ROW signal from CN driving OR gate 61. All TAM chips are connected to the common CLOCK signal for synchronous operation. All read/write (Do/Di) data signals are connected to a common, and all TAM chips receive a common /WE signal.

The apparatus of FIG. 6 constitutes a simple expansion of the TAM unit concept, because only one signal from each chip need be connected to the next chip. The LAST ROW signal from one chip is connected to the Start-act-ROW input of the next chip. The Start-act-Row input of the first chip C1 is activated either by POWER-ON, or by the LAST ROW signal of the last chip CN. The POWER-ON signal is used to start memory access for the first time upon system power up. In some embodiments, the POWER-ON signal is generated from a conventional circuit that provides a pulse when the supply voltage changes from 0 to 1 on power on. The data is read from or written to the selected cell based on the /WE signal.

In some embodiments, each TAM chip C1-CN includes a DRAM with M Rows and K Columns. For N TAM chips, the total number of memory storage locations in FIG. 6 is N×M×K locations. It will thus take in the order of N×M×K cycles to access the entire TAM apparatus, and the access repeats every N×M×K cycles in the serial cyclic fashion described above.

In the apparatus of FIG. 6, the access of memory starts from first location of the first chip and ends at the last location of the last chip. The number of locations to access in a memory cycle is always fixed. For a complete memory cycle, all memory locations are accessed as described above. The data processing resource must wait until the memory location it needs becomes available, even it does not need access to locations that become available before the needed location.

The broken line in FIG. 6 represents TAM chips that are not explicitly shown.

Figure 7:
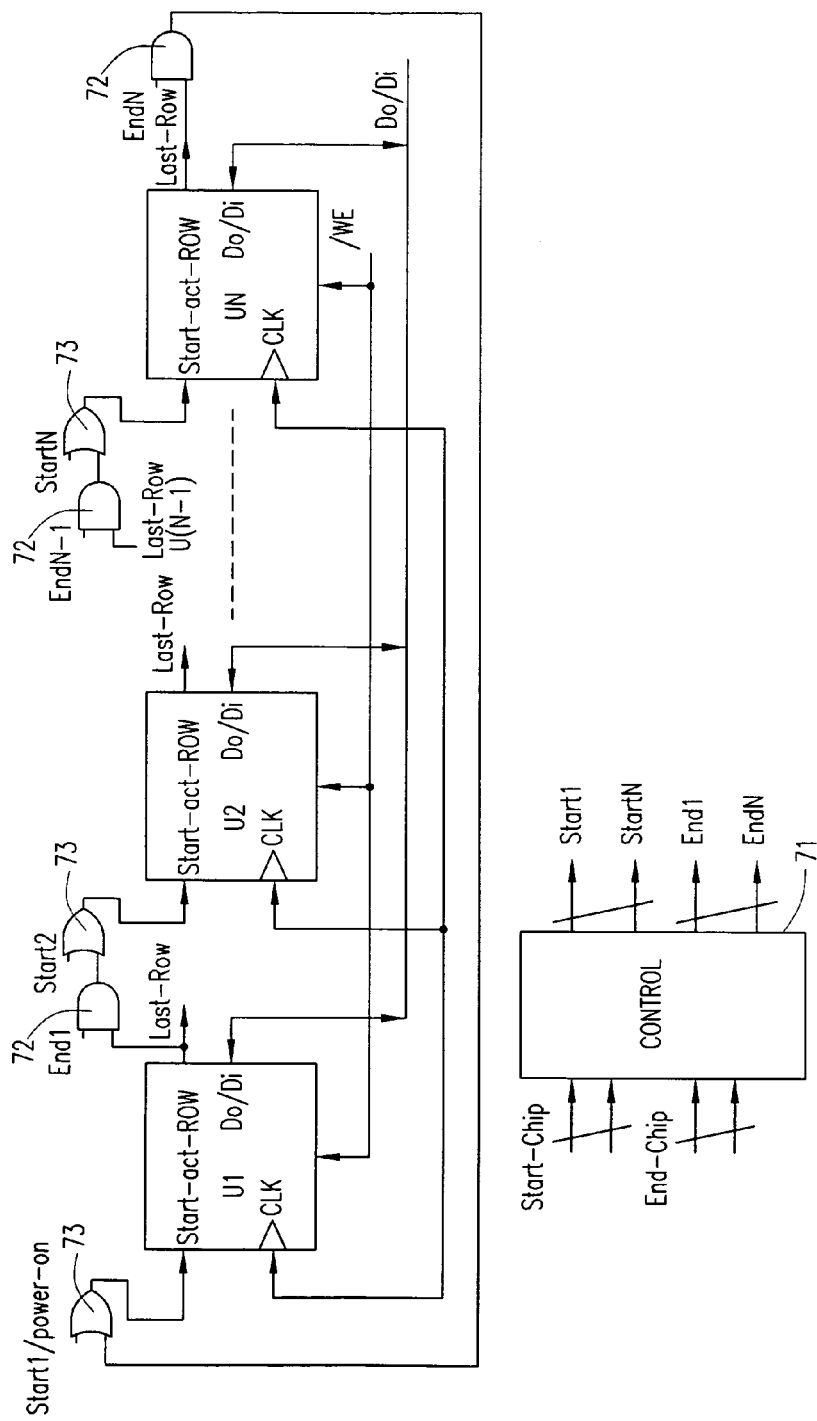
FIG. 7 diagrammatically illustrates a portion of FIG. 1 in more detail according to example embodiments of the invention.

FIG. 7 diagrammatically illustrates a TAM apparatus that is adaptable to the demands of the data processing resource, and supports variable memory access patterns. The adaptable TAM apparatus uses a control circuit 71 to determine which of N TAM chips U1-UN to access. In some embodiments, each of the TAM chips U1-UN includes a TAM unit as described above with respect to FIGS. 1-5, but (and as described hereinafter) whose LAST ROW signal drives logic external to the TAM unit, and whose Start-act-Row signal is produced by logic external to the TAM unit. The control circuit 71 uses a start chip address to select the first chip to be accessed, and an end chip address to select the last chip to be accessed. The number of address lines used to represent the start and end chip addresses is log 2 of the number of chips. To explain the operation, assume, for example, that the number of chips is 16, that each DRAM has 64 Million locations, and that the processor needs to access a portion of memory (memory section) from location 193 million to location 520 million. The start chip will be chip U4 (193/64=4), and the end chip will be chip U9 (520/64=9). Only chips U4, U5, U6, U7, U8 and U9 are accessed. The control circuit 71 will make the Start4 output signal active by decoding the start chip address received from the processing resource. In some embodiments, Start4 is a pulse that becomes active at the start of the memory access operation, and then becomes active again in response to activation of the LAST ROW signal of the last chip to be accessed (chip U9 in the example above).

In some embodiments, the following conditions make Start4 active: (1) the decode of start chip address 4 makes Start4 active long enough to start a memory access (similar to the POWER-ON time pulse time); and (2) the decode of end chip address 9 AND activation of the LAST-ROW signal of chip U9 initiate activation of Start4 to commence the cyclic memory access. The size of the memory in TAM chip U9 is known, so the control circuit 71 can, in some embodiments, simply use a counter to determine when the LAST ROW signal of chip U9 becomes active.

The control circuit 71 decodes the end chip address 9, and activates all of the End signals of the chips from first chip U4 to last chip U9. Thus, End4, End5, End6, End7, End8 and End9 become active. The End signal associated with a given chip qualifies that chip's LAST ROW signal at an associated AND gate 72. The outputs of the AND gates 72 drive inputs of respectively associated OR gates 73, whose other inputs are driven by the respectively associated Start signals. The outputs of the OR gates 73 drive the Start-act-Row inputs of the chips U1-UN. The logic at 72 and 73 thus permits any one of the chips U1-UN to be the first chip of the selected chip sequence, or to be at any other desired position within the selected chip sequence.

For the example given above, in some embodiments, the conditions to make any End signal active are: the associated chip number is greater than or equal to 4 (the start chip address) AND less than or equal to 9 (the end chip address). The logic design needed to implement this functionality is well within the skill of workers in the art. Some embodiments use a combination of a comparator, decoder and encoder to implement this functionality.

The broken line in FIG. 7 represents instances of TAM chips and associated logic 72 and 73 that are not explicitly shown.

Figure 8:
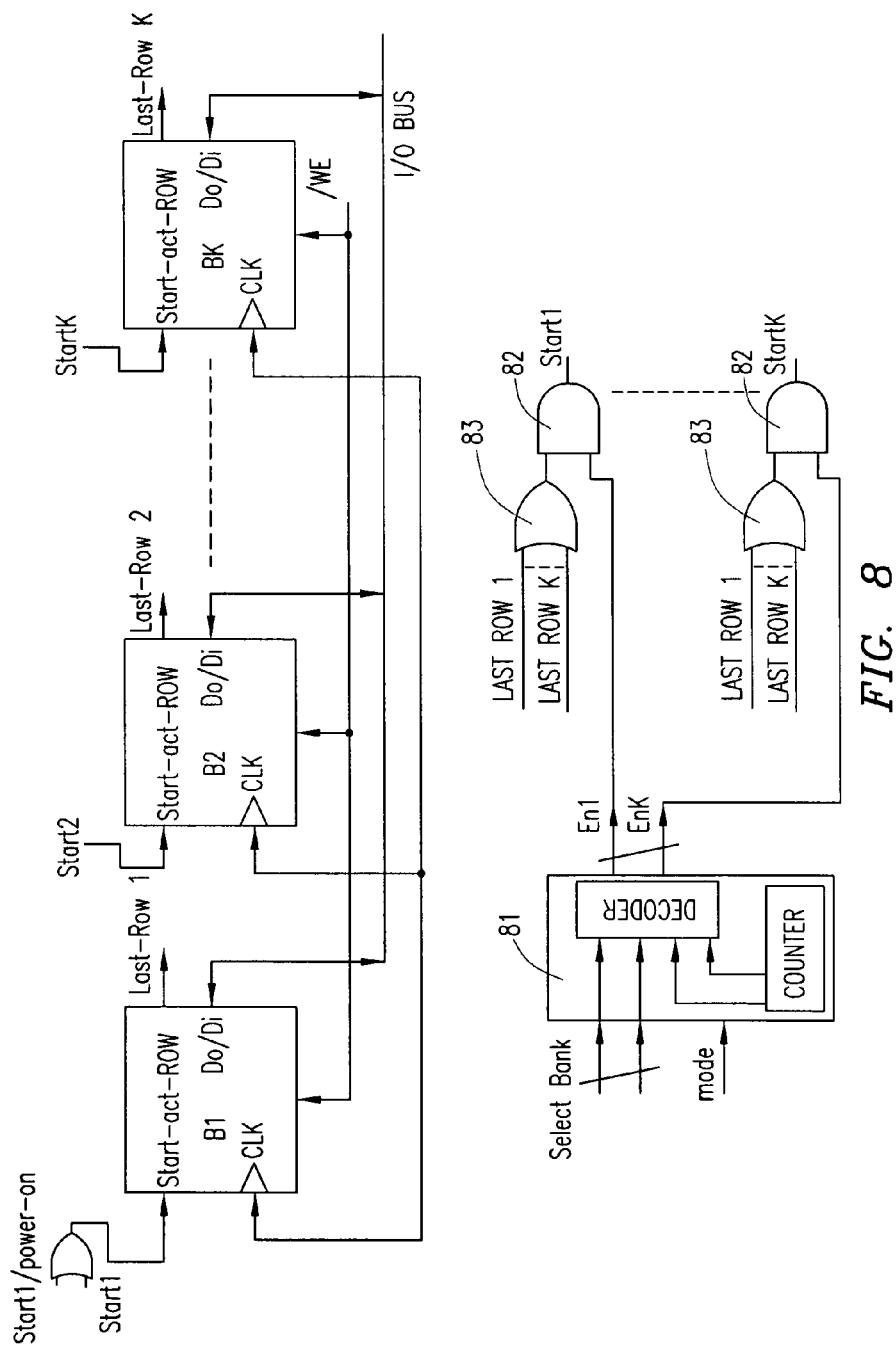
FIG. 8 diagrammatically illustrates a portion of FIG. 1 in more detail according to example embodiments of the invention.

FIG. 8 diagrammatically illustrates a TAM apparatus that supports out of order memory access according to example embodiments of the invention. If the memory is, for example, a DRAM having 1024 rows, this could be divided into 32 banks of 32 rows each. The number of locations in each bank depends on the number of columns in each row. For example, in FIG. 8, each of B1-BK could represent a TAM unit (see also FIGS. 1-5) whose associated memory is a 32-row bank of the DRAM, but (and as described hereinafter) whose LAST ROW signal drives logic outside the TAM unit, and whose Start-act-Row signal is produced by logic outside the TAM unit. A decoder/counter unit 81 generates the Start-act-Row signals based on a select bank address and a mode signal. If, for example, the select bank address is 17, and the mode is set for OUT OF ORDER operation, the unit 81 decodes the address and makes enable signal En17 active. The En signals are input to respective AND gates 82, where they are qualified by activation of the LAST ROW signal associated with the currently accessed bank, which indicates the end of the current bank access. The LAST ROW signals for all K banks (LAST ROW 1-LAST ROW K) are input to OR gates 83 respectively associated with the K AND gates 82. The outputs of the OR gates 83 are input to the respectively associated AND gates 82 to qualify the respective En signals.

The value of the select bank address determines which bank to be accessed next in any order, thus allowing for OUT OF ORDER access patterns. To support IN ORDER access patterns, the unit 81 has a counter that counts from 0 to the total number of banks. The counter output is connected to the decoder. If the mode signal is set for IN ORDER access, then the decoder simply decodes the output of the counter instead of decoding the select bank address.

The broken lines in FIG. 8 represent instances of TAM chips and associated logic 82 and 83 that are not explicitly shown.

Some embodiments expand the OUT OF ORDER access technique to multiple DRAM chips (rather than multiple banks within a single DRAM chip). A memory controller selects the next chip based on a chip select address analogous to the select bank address of FIG. 8. The controller waits for the LAST ROW signal from the currently accessed chip, and then decodes the next chip select address. Then it generates the Start-act-Row signal for the selected chip. The Start-act-Row signals of the rest of the chips are held inactive so these remaining chips cannot start any access.

Figure 9:
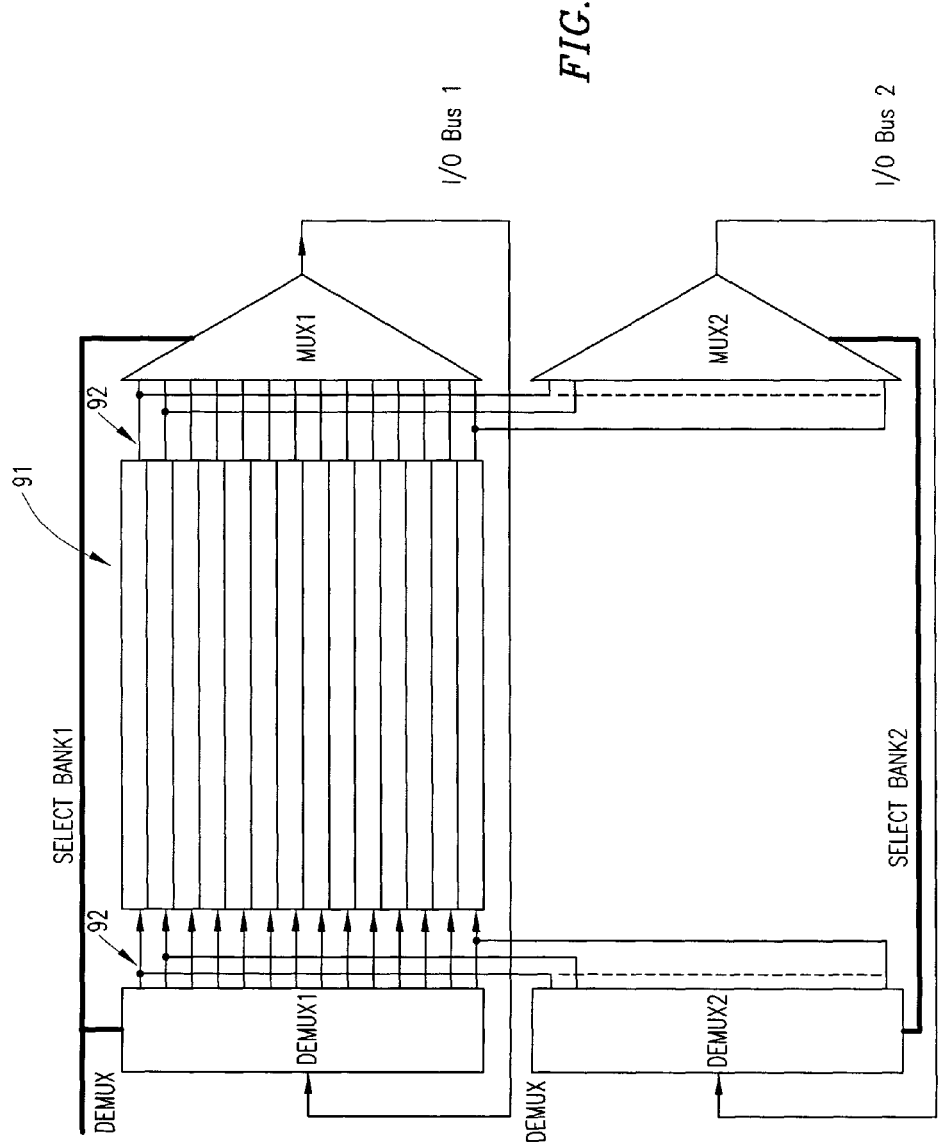
FIG. 9 diagrammatically illustrates a portion of FIG. 1 in more detail according to example embodiments of the invention.

FIG. 9 diagrammatically illustrates a TAM apparatus that permits parallel cyclic memory accesses according to example embodiments of the invention. The apparatus of FIG. 9 has a control arrangement that includes multiplexers MUX1 and MUX2, and respectively associated De-multiplexers DEMUX1 and DEMUX2. Some embodiments include a plurality of TAM units (described above with respect to FIGS. 1-5), shown generally at 91, whose respective memory components are banks within an overall memory array. The content stored in each bank can thus continually spin on its respectively corresponding bank bus (see bank buses 92). Each bank bus is connected to respectively corresponding inputs of MUX1 and MUX2, and to respectively corresponding outputs of DEMUX1 and DEMUX2. The output of MUX1 and the input of associated DEMUX1 are coupled to I/O BUS1, and the output of MUX2 and the input of associated DEMUX2 are coupled to I/O BUS2. Bank select addresses SELECT BANK1 and SELECT BANK2 indicate the specific banks that are to be accessed in parallel. Data that is read from the selected banks can pass in parallel through MUX1 and MUX2 to I/O BUS1 and I/O BUS2. Data to be written in the selected banks can pass in parallel from I/O BUS1 and I/O BUS2 through DEMUX1 and DEMUX2. The banks can be accessed in any desired sequence by appropriately controlling SELECT BANK1 and SELECT BANK2. The broken lines in FIG. 9 represent signal paths that are not explicitly shown.

As described above, the TAM apparatus of FIG. 9 can access data associated with more than one bank at the same time. In a system with more than one processor, a first processor (or group of processors) could have simultaneous shared access to one portion of memory while, simultaneously, a second processor (or group of processors) has simultaneous shared access to a different portion of memory. The aforementioned first and second processing entities can operate independently of each other, and can access respectively different size portions of (e.g., different numbers of banks within) the memory array, with different associated cycle times. For each of the two different parallel accesses, the TAM cycle time is the time required to access the associated portion of memory in serial fashion until the access repeats.

Figure 10:
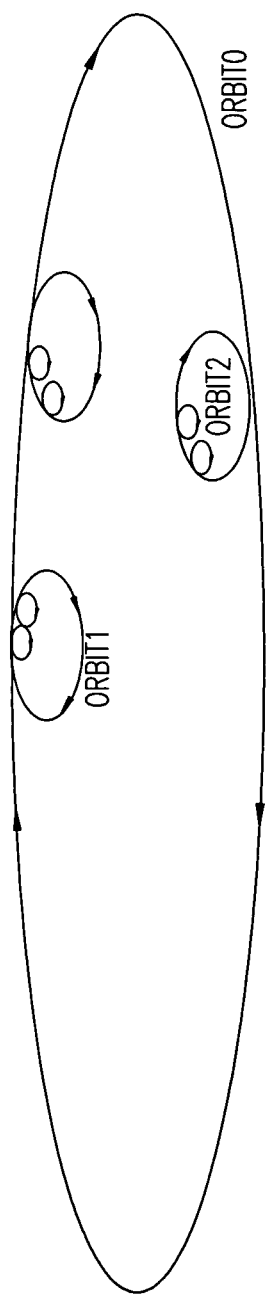
FIG. 10 diagrammatically illustrates a multi-level time addressable memory (TAM) concept according to example embodiments of the invention.

FIG. 10 illustrates, according to example embodiments of the invention, a concept referred to herein as Multi-Level TAM. According to this concept, all locations within the overall memory "spin" on an overall access level referred to as ORBIT0. At this level, each memory location in the entire memory is sequentially accessed and is available to an I/O bus for one clock cycle. Other sections of the memory are also simultaneously rotating their contents in cyclic fashion. Each ORBIT1 level shown in FIG. 10 "spins" a subset of the entire memory, which occurs at a faster cycle time than the ORBIT0 cycle time (because ORBIT1 involves fewer memory locations than ORBIT0). Each ORBIT2 level "spins" a subset of the memory locations associated with a corresponding ORBIT1 level, and thus contains a still smaller number of memory locations, and exhibits a still faster cycle time than that of the associated ORBIT1 level. Note that the ORBIT0 level accesses memory locations associated with both the ORBIT1 levels and ORBIT2 levels. In some embodiments, each ORBIT1 level is associated with a first integer number of memory sections (e.g., banks), and each ORBIT2 level is associated with a second, smaller integer number of memory sections.

Figure 11:
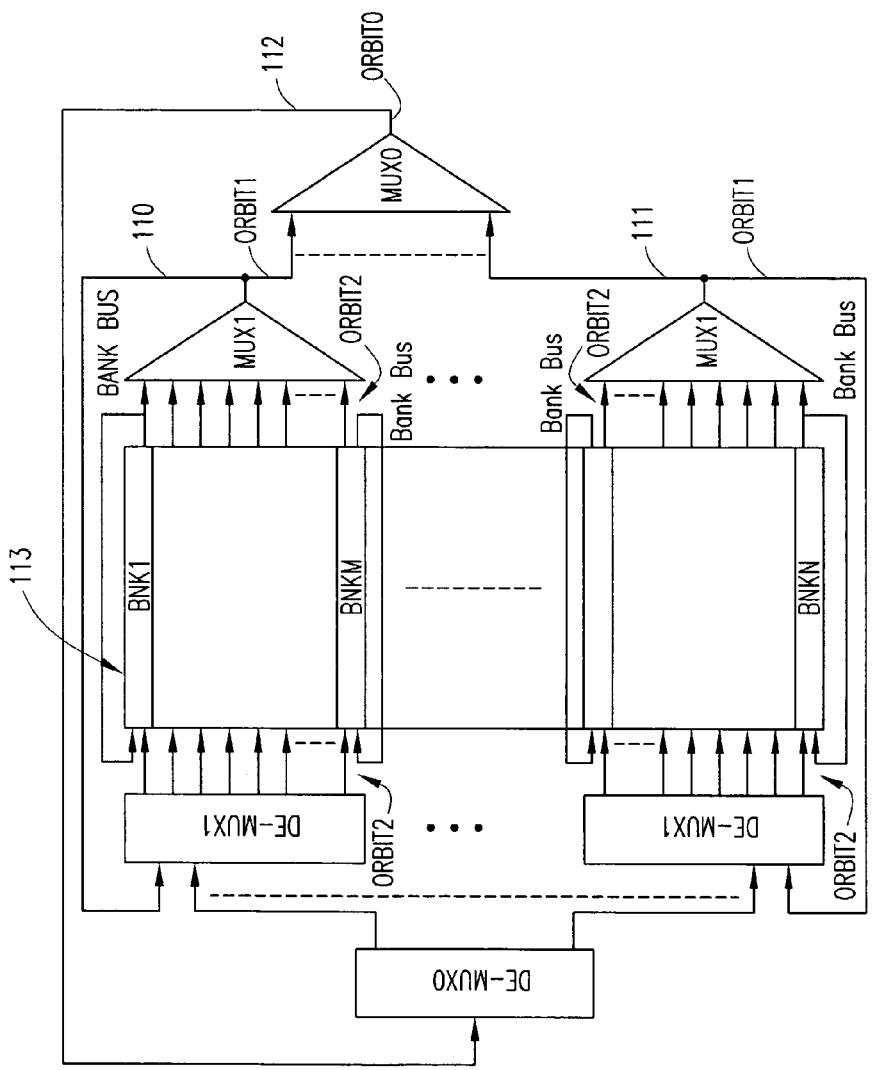
FIG. 11 diagrammatically illustrates a portion of FIG. 1 in more detail according to example embodiments of the invention.

FIG. 11 diagrammatically illustrates a memory apparatus that implements multi-level TAM (see also FIG. 10) according to example embodiments of the invention. Some embodiments include a plurality of TAM units (described above with respect to FIGS. 1-5), shown generally at 113, whose respective memory components are banks within an overall memory array. The contents of each bank continually spin on the respectively corresponding bank bus. Referring also to the example of FIG. 10, the N bank buses of FIG. 11 correspond to the ORBIT2 level.

The multiplexers designated as MUX1 permit read access at the next level (ORBIT1). More specifically, each MUX1 is controlled by a bank select signal (not explicitly shown in FIG. 11) to make an associated group of bank buses available in a continually repeating sequence on a respectively corresponding bus at the output of that MUX1. For memory write access, each MUX1 output bus is also connected to an input of an associated DE-MUX1 de-multiplexer which is controlled by the same bank select signal as the associated MUX1 multiplexer. For example, if the bank bus for bank BNK1 is initially connected to bus 110, after the contents of BNK1 have been cycled through, the bank bus for bank BNK2 is then connected to bus 110. The sequence continues through bank BNK M, and then returns to BNK1 to repeat the bank access cycle. The bus 110 thus corresponds to an ORBIT1 level of FIG. 10, as does the bus 111 and all other buses at the MUX1/DE-MUX1 level in FIG. 11.

The MUX0 multiplexer and the associated DE-MUX0 de-multiplexer are controlled by a common select signal (not explicitly shown) to handle the ORBIT1 level buses (110, 111, etc.) in the same manner that the MUX1/DE-MUX1 pairs handle their associated ORBIT2 level (bank) buses. That is, the ORBIT1 level buses (110, 111, etc.) are available on bus 112 in a continually repeating sequence. The bus 112 thus provides continually repeating access to all locations in the memory 113, and therefore corresponds to the ORBIT0 level of FIG. 10.

The broken lines in FIG. 11 represent TAM units and signal paths that are not explicitly shown.

Figure 12:
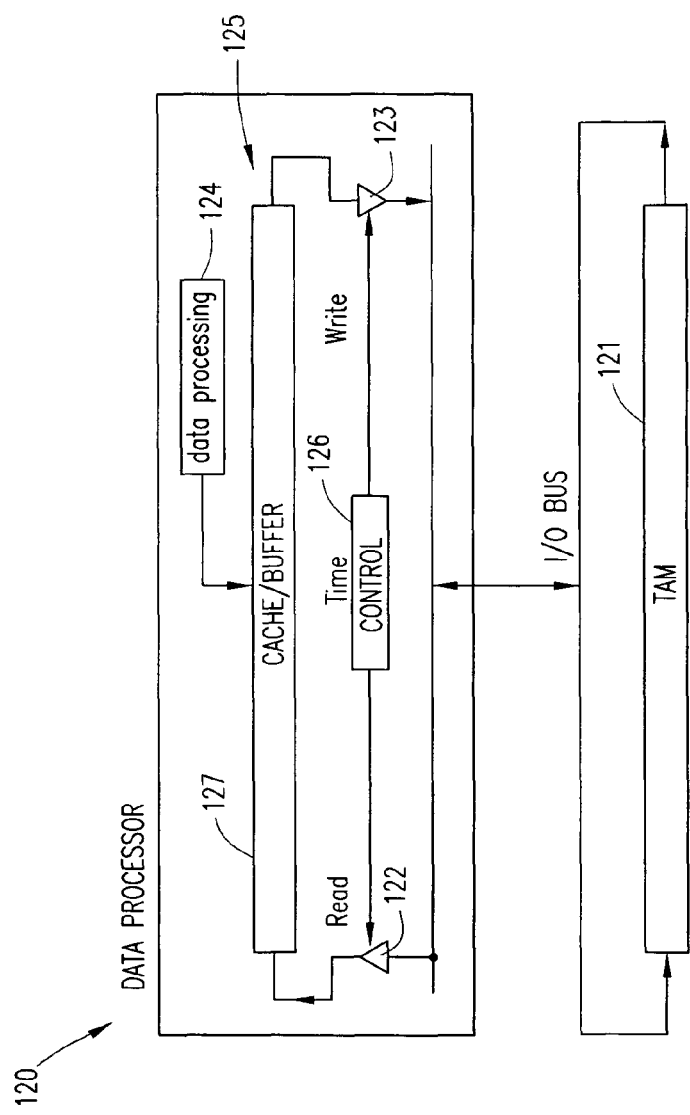
FIG. 12 diagrammatically illustrates a portion of FIG. 1 in more detail according to example embodiments of the invention.

FIG. 12 diagrammatically illustrates a data processing apparatus according to example embodiments of the invention. The data processing apparatus 120 includes a data processing portion 124 coupled to a memory interface portion 125. The memory interface portion 125 interfaces between the data processing portion 124 and a TAM apparatus 121. The memory interface portion 125 uses a large buffer or cache 127 to capture all needed accesses in one TAM cycle. The time to access any location in a miss will be at most the waiting time to transfer the whole memory out in the first memory spin. In some embodiments, the cache size is equal to the size of the memory section that is cyclically accessed. The transfer of data to the cache or buffer takes only one full TAM cycle and need not occur again until the operating system of the data processor decides to flush the cache. Writing from the cache to the TAM apparatus 121 takes one full TAM cycle. The memory interface portion 125 has a timing controller 126 that is synchronized with the TAM cycle of the TAM apparatus 121 in order to track each memory location of the TAM cycle in time. In some embodiments, the timing controller 126 includes a counter to track the TAM cycle. If the data processing portion 124 needs to read or write data associated with the currently accessed memory location, it appropriately controls the /WE signal (not shown in FIG. 12), and notifies the timing controller 126 of the desired read or write. The timing controller 126 can then appropriately control tri-state buffers 122 and 123 for read/write operation. In various embodiments, the TAM apparatus 121 corresponds to the various TAM apparatus described above with respect to FIGS. 1-8.

Figure 12A:
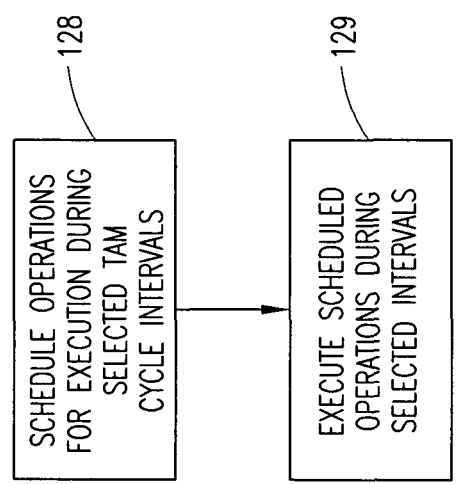
FIG. 12A illustrates operations that can be performed according to example embodiments of the invention.

Some embodiments use a limited size cache buffer that is only large enough to capture the number of locations needed in a particular application. In some embodiments, the data processor and compiler can efficiently map the access times of memory locations based on a particular application's anticipated memory access behavior and requirements, thereby permitting the data processing portion 124 to efficiently interleave cache access operations with data processing operations of the application. In some embodiments, for example, certain operations of a particular application can be scheduled for execution during predetermined intervals of the overall TAM cycle associated with data that is not timing-critical to the application. On the other hand, for example, during intervals when timing-critical data is being accessed from the TAM apparatus 121, the operating system of the data processing portion 124 can be scheduled (and/or the application can be interrupted) to pull the data from the cache 127 as soon as it arrives from the TAM apparatus 121. An example of this type of scheduling is illustrated generally in FIG. 12A. At 128, certain operations of the data processing application are scheduled for execution during certain intervals of the TAM cycle that have been selected based on a memory access characteristic of the data processing application. For example, intervals where accessed data is not timing-critical to the application could be selected. At 129, the operations scheduled at 128 are executed during the selected intervals.

In some embodiments, the data processor uses pipelining in conventional fashion to overlap execution time with memory access time.

Figure 13:
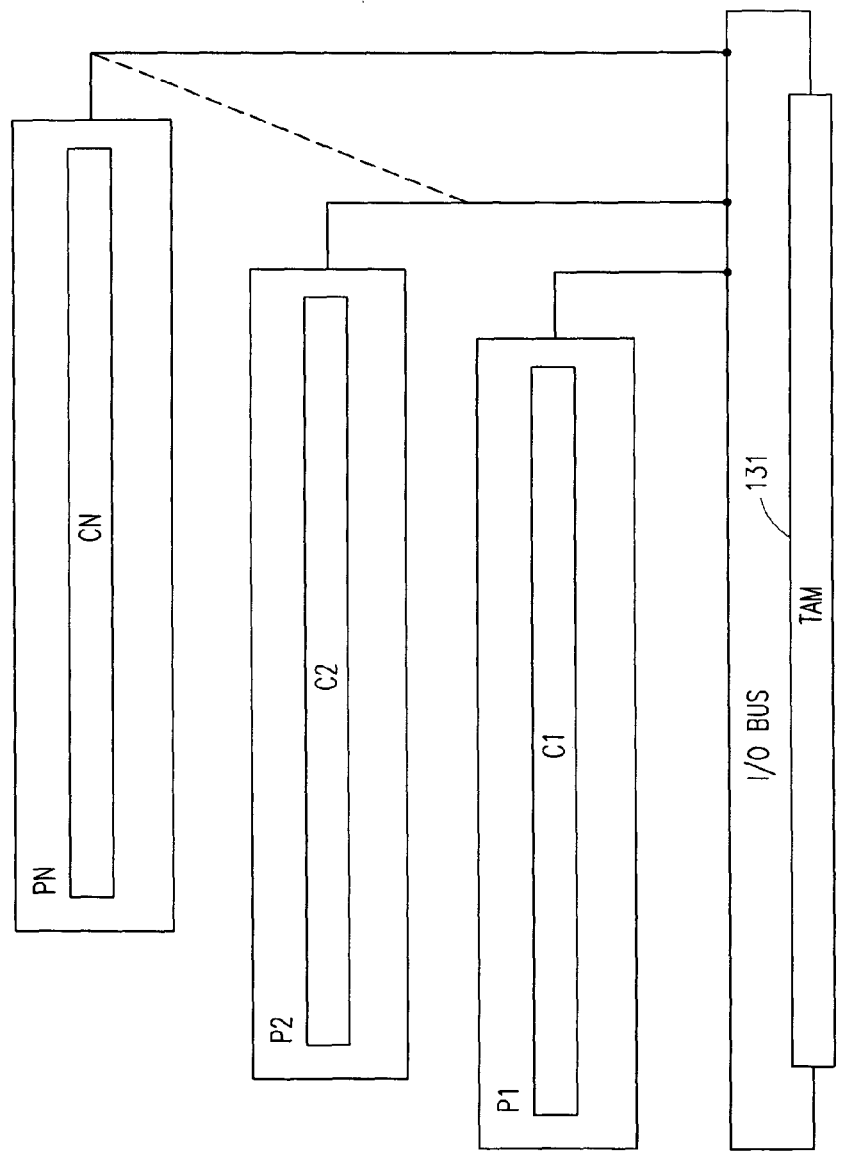
FIG. 13 diagrammatically illustrates a portion of FIG. 1 in more detail according to example embodiments of the invention.

FIG. 13 diagrammatically illustrates a multiprocessor apparatus according to example embodiments of the invention. Multiple data processors P1-PN are connected in parallel to the I/O bus of the TAM apparatus 131. The data processors wait for the data without the need for each data processor to arbitrate and obtain its own exclusive access to the bus and memory. The data processors P1-PN have respective caches C1-CN to store all needed data for their respective applications. In some embodiments, each data processor runs a single thread, and the threads are independent from each other. In embodiments that run parallel applications, data sharing and synchronization are simplified because of the natural serialization of data on the bus due to each memory location being accessed at a known point in time. Parallel processors depend on the cyclic behavior of TAM for synchronization and access to shared data, without the need for complicated cache coherency protocols as in conventional multiprocessor arrangements. The performance of the multiprocessor apparatus of FIG. 13 is linearly scalable to literally any desired number of processors. In various embodiments, the TAM apparatus 131 corresponds to the various TAM apparatus described above with respect to FIGS. 1-8. The broken line in FIG. 13 represents data processors and signal paths that are not explicitly shown.

Figure 14:
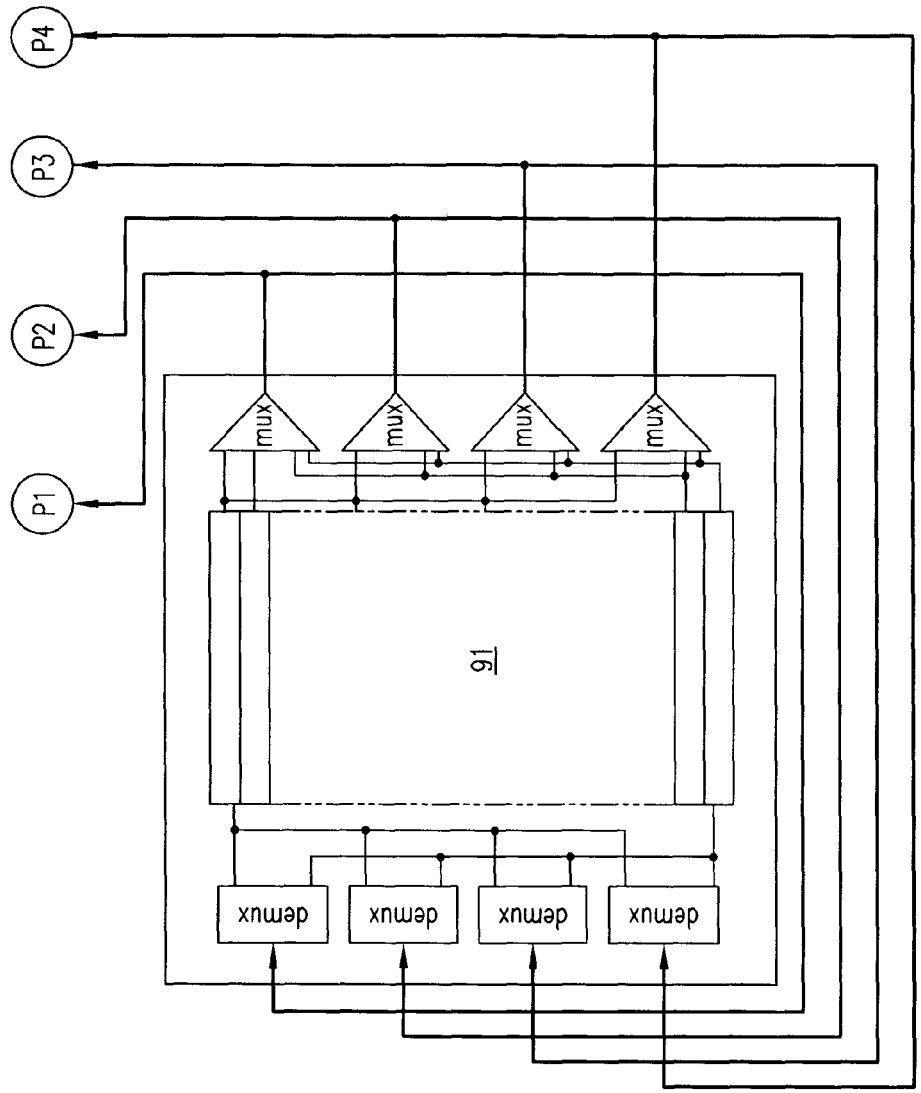
FIG. 14 diagrammatically illustrates a portion of FIG. 1 in more detail according to example embodiments of the invention.

FIG. 14 diagrammatically illustrates a multiprocessor apparatus using parallel TAM (see also FIG. 9) according to example embodiments of the invention. Each data processor P1-P4 is connected to a respectively corresponding I/O bus associated with a respectively corresponding multiplexer/De-multiplexer set. Each data processor can use its associated bank select signal to access any specific bank in the memory array. Any or all of the data processors P1-P4 can share the same portion of memory at the same time. The data processors can simultaneously access respectively different portions of memory. The data processors can simultaneously access respectively different size portions of memory with respectively different cycle times. Each data processor uses a bank select address to access the desired data without any need for arbitration or waiting. Bank conflicts do not occur during read operations because more than one data processor can read the data of from a single bank at the same time. If two or more data processors write to one bank at the same time, this will cause a bank conflict, which can be detected and avoided using conventional techniques. The broken lines in FIG. 14 represent TAM units and signal paths that are not explicitly shown.

Figure 15:
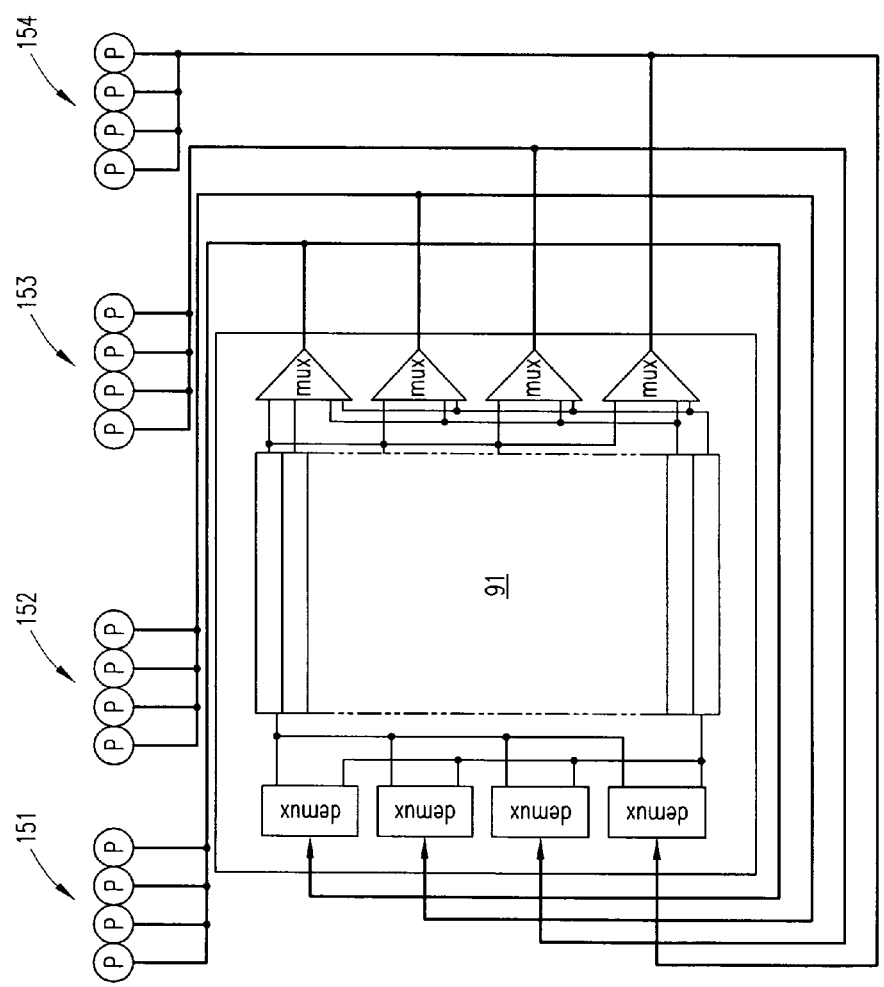
FIG. 15 diagrammatically illustrates a portion of FIG. 1 in more detail according to example embodiments of the invention.

FIG. 15 diagrammatically illustrates a parallel multiprocessor apparatus using parallel TAM (see also FIG. 9) according to example embodiments of the invention. Each group 151-154 of data processors P is connected to a respective I/O bus associated with a respective multiplexer/De-multiplexer set, permitting each group to access a desired section of memory based on its bank select address. Any or all of the groups 151-154 can share the same portion of memory at a specific time, or various groups can access various different (and/or different size) portions of memory simultaneously. A first level of parallelism is achieved by each group 151-154 sharing one multiplexer/De-multiplexer set. A second level of parallelism is achieved by all groups accessing the common memory in parallel. The broken lines in FIG. 15 represent TAM units and signal paths that are not explicitly shown.

Figure 16:
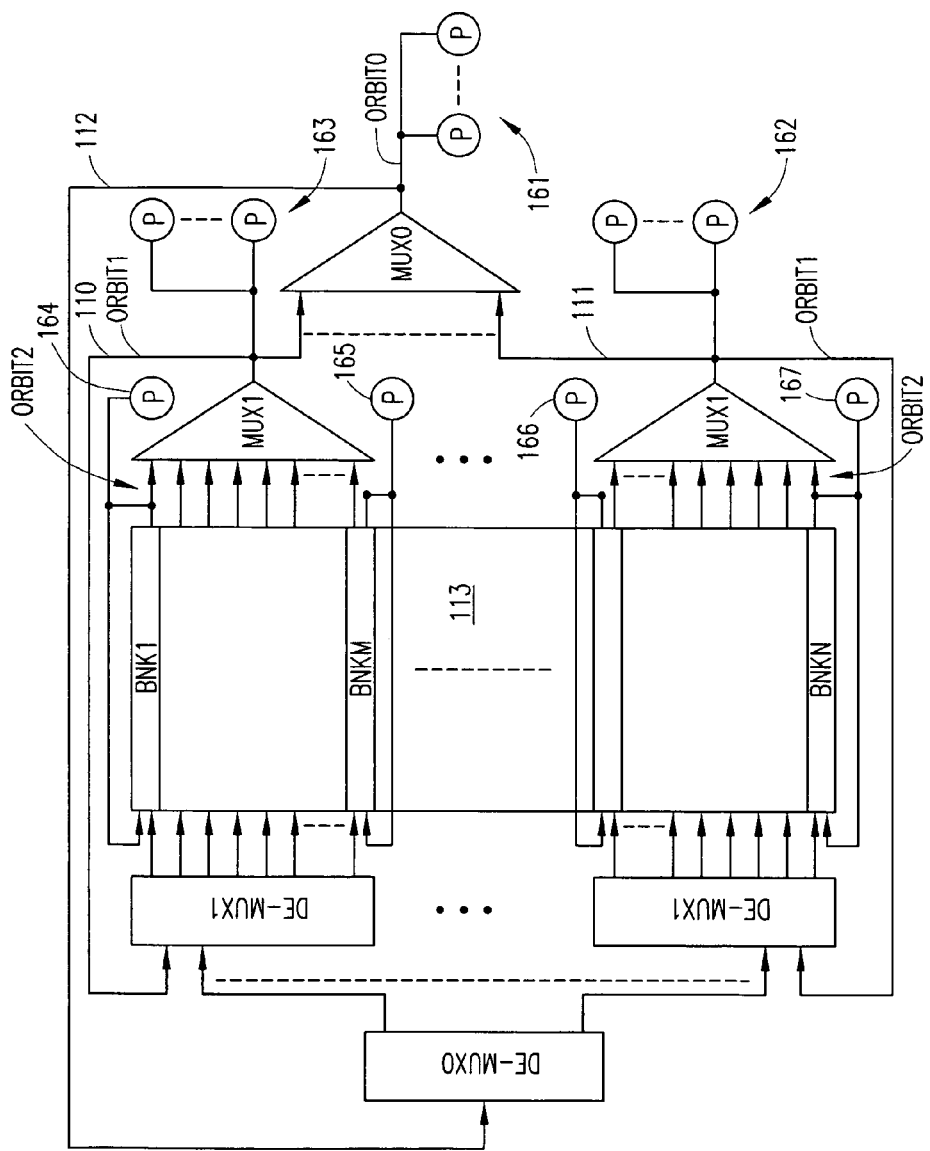
FIG. 16 diagrammatically illustrates a portion of FIG. 1 in more detail according to example embodiments of the invention.

FIG. 16 diagrammatically illustrates a multiprocessor apparatus using Multi-Level TAM (see also FIGS. 10 and 11) according to example embodiments of the invention. Each group 161-163 of data processors P is connected to a respective I/O bus associated with a respective multiplexer/De-multiplexer set. The group 161 uses a bank select address to access memory at the ORBIT0 level (see also FIGS. 10 and 11), and the groups 162 and 163 use respective bank select addresses to access memory at respective ORBIT1 levels. Other data processors 164-167 are directly connected to respective ones of the bank buses (see also FIG. 11) and thus have access to memory at the ORBIT2 level. In some embodiments, the highest orbit level has priority for write access. For example, during the time that bank BNK1 is available at the ORBIT1 level (on bus 110), the data processor 164 that accesses BNK1 at the ORBIT2 level (on the bank bus for BNK1) is not permitted to write to BNK1. Similarly, during the time that BNK1 is available at the ORBIT0 level (on bus 112), neither the data processor group 163 that accesses BNK1 at the ORBIT1 level (on bus 110), nor the data processor 164 that accesses BNK1 at the ORBIT2 level (on the bank bus for BNK1), is permitted to write to BNK1. The broken lines in FIG. 16 represent TAM units, data processors and signal paths that are not explicitly shown.

Figure 17:
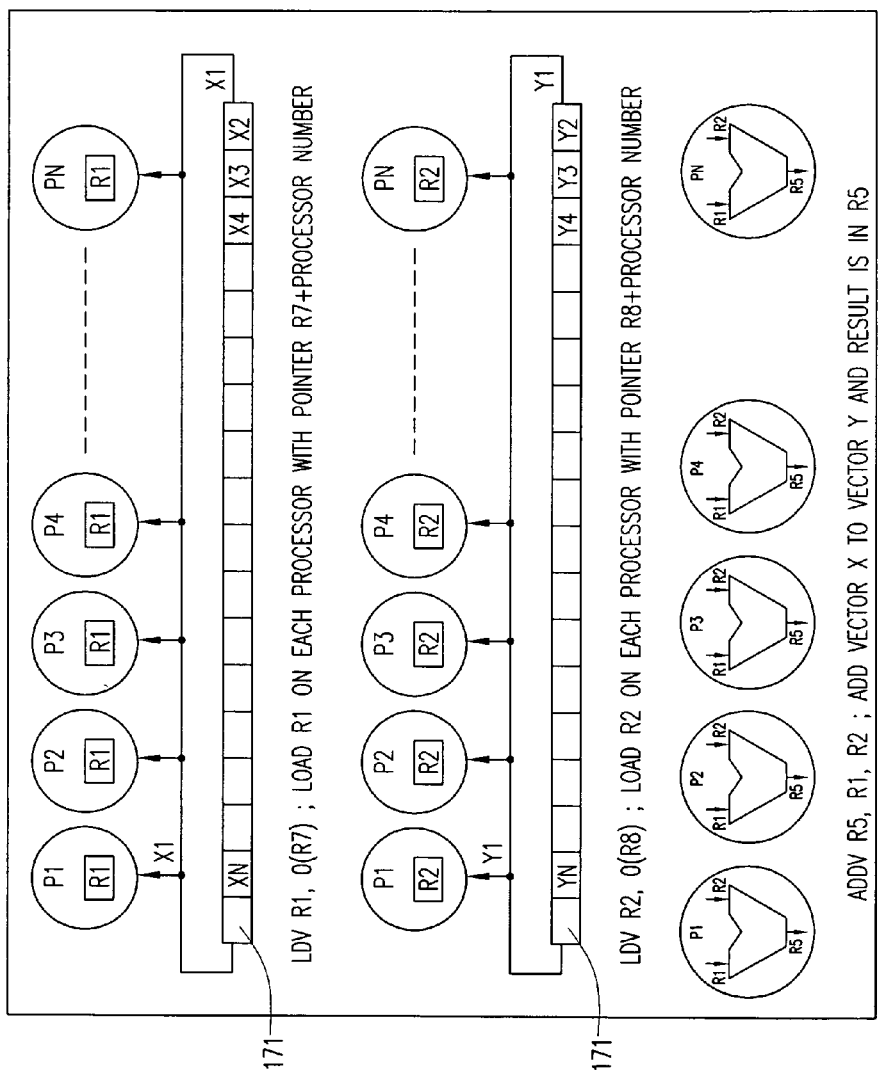
FIG. 17 diagrammatically illustrates a portion of FIG. 1 in more detail according to example embodiments of the invention.

FIG. 17 diagrammatically illustrates a SIMD (Single Instruction Multiple Data) data processing architecture using TAM to support vector operations according to example embodiments of the invention. The content of each memory location is placed on the I/O bus for a single clock cycle, and each of the data processing elements P1-PN can read its associated location without arbitration or waiting. The vectors X and Y each contain N elements (X1-XN, Y1-YN) that are stored in N sequentially accessible memory locations in a TAM apparatus 171 (see also FIGS. 1-8). The N elements of either vector can be read or written to by the N data processing elements in N clock cycles. The example vector operations described below are illustrated in FIG. 17.

The LDV R1, 0(R7) instruction of FIG. 17 loads a vector with N elements into the R1 registers of the N processors P1-PN, using R7 of each processor as a pointer. With R7 of each processor containing the same pointer value, each processor transfers a respectively associated element of vector X to its register R1 during a clock cycle number (CC#) equal to: [content of register R7]+[processor number]. Accordingly, the clock cycle number during which the processor P1 loads element X1 into its register R1 is given by CC#=[R7 content]+1. Similarly, processor P2 loads the second element X2 of vector X into its register R1 register during CC#=[R7 content]+2. Processor PN loads the last element XN of vector X into its R1 register during CC#=[R7 content]+N. The full vector X is thus transferred from memory into the registers R1 of the processors P1-PN in N cycles.

The LDV R2, 0(R8) instruction of FIG. 17, executed analogously to the instruction LDV R1, 0(R7), transfers the second vector Y to the registers R2 of processors P1-PN in N cycles, with the content of register R8 holding a common pointer value in each processor.

In the ADD R5, R1, R2 instruction of FIG. 17, every processor P1-PN adds its associated element of the vector X (in register R1) to its associated element of the vector Y (in register R2). (Each addition result is stored in the processor's R5 register.) All of the N addition operations performed by the N processors P1-PN can be performed in parallel, during a single clock cycle.

The broken lines in FIG. 17 represent data processors and signal paths that are not explicitly shown.

The foregoing description demonstrates numerous advantages associated with example embodiments of the invention. Some of these advantages are summarized here. The memory access is fast because it occurs sequentially in time rather than via the conventional random access in space. The time at which each memory location access occurs is already known so, with a DRAM, there would be no waiting time for precharge, or decoding. A DRAM can be accessed sequentially in a serial fashion without the need for addressing or decoders. Because the time of each memory location access is already known, time overhead can be hidden and overlapped among different banks. Memory address signals are not needed, so address inputs can be eliminated altogether from the memory package design, or can be replaced by additional data terminals to increase the data transfer bandwidth of the memory package.

Although example embodiments of the invention have been described above in detail, this does not limit the scope of the invention, which can be practiced in a variety of embodiments.

What is claimed is:

1. A method of providing a data processor with access to a plurality of memory locations in a memory, comprising:
   independently of the data processor, accessing the memory locations sequentially and repetitively to produce a continually repeating sequence of memory location accesses; and
   making said continually repeating sequence of memory location accesses available to the data processor.

2. The method of claim 1, including making said continually repeating sequence of memory location accesses simultaneously available to a plurality of data processors.

3. A method of providing a plurality of data processors with shared access to a memory having a plurality of memory locations, comprising:
   independently of the data processors, accessing a first group of the memory locations sequentially and repetitively to produce a first continually repeating sequence of memory location accesses;
   making said first continually repeating sequence of memory location accesses available to a first one of the data processors;
   independently of the data processors, accessing a second group of the memory locations sequentially and repetitively to produce a second continually repeating sequence of memory location accesses; and
   making said second continually repeating sequence of memory location accesses available to a second one of the data processors.

4. The method of claim 3, including making said first continually repeating sequence of memory location accesses simultaneously available to the first data processor and a third one of the data processors.

5. The method of claim 4, including making said second continually repeating sequence of memory location accesses simultaneously available to the second data processor and a fourth one of the data processors.

6. The method of claim 3, including performing said accessing steps simultaneously, and performing said making steps simultaneously.

7. The method of claim 3, wherein said second group is a subset of said first group.

8. The method of claim 7, including making said first continually repeating sequence of memory location accesses simultaneously available to the first data processor and a third one of the data processors.

9. The method of claim 8, including making said second continually repeating sequence of memory location accesses simultaneously available to the second data processor and a fourth one of the data processors.

10. The method of claim 7, including, independently of the data processors, accessing a third group of the memory locations sequentially and repetitively to produce a third continually repeating sequence of memory location accesses, and making said third continually repeating sequence of memory location accesses available to a third one of the data processors, wherein said third group is a subset of said second group.

11. The method of claim 10, including making said first continually repeating sequence of memory location accesses simultaneously available to the first data processor and a fourth one of the data processors.

12. The method of claim 11, including making said second continually repeating sequence of memory location accesses simultaneously available to the second data processor and a fifth one of the data processors.

13. The method of claim 7, including performing said accessing steps simultaneously, and performing said making steps simultaneously.

14. A memory apparatus for use with a data processor, comprising:
   a memory having a plurality of memory locations;
   a memory controller coupled to said memory and cooperable therewith independently of the data processor for accessing said memory locations sequentially and repetitively to produce a continually repeating sequence of memory location accesses; and
   a bus coupled to said memory and adapted for coupling to the data processor to make said continually repeating sequence of memory location accesses available to the data processor.

15. The apparatus of claim 14, wherein said bus is adapted for coupling to a plurality of data processors to make said continually repeating sequence of memory location accesses simultaneously available to the plurality of data processors.

16. The apparatus of claim 14, wherein said plurality of memory locations includes groups of physically adjacent memory locations, and wherein said continually repeating sequence of memory location accesses provides access to first and second ones of said groups without providing access to a third one of said groups that is physically interposed between said first and second groups.

17. A memory apparatus for use with a plurality of data processors, comprising:
   a memory having a plurality of memory locations;
   a memory controller coupled to said memory and cooperable therewith independently of the data processors for accessing a first group of the memory locations sequentially and repetitively to produce a first continually repeating sequence of memory location accesses, and accessing a second group of the memory locations sequentially and repetitively to produce a second continually repeating sequence of memory location accesses;
   a first bus coupled to said memory and adapted for coupling to a first one of the data processors to make said first continually repeating sequence of memory location accesses available to the first data processor; and
   a second bus coupled to said memory and adapted for coupling to a second one of the data processors to make said second continually repeating sequence of memory location accesses available to the second data processor.

18. The apparatus of claim 17, wherein said first bus is adapted for coupling to a third one of the data processors to make said first continually repeating sequence of memory location accesses simultaneously available to the first data processor and the third data processor.

19. The apparatus of claim 18, wherein said second bus is adapted for coupling to a fourth one of the data processors to make said second continually repeating sequence of memory location accesses simultaneously available to the second data processor and the fourth data processor.

20. The apparatus of claim 17, wherein said memory controller produces said first and second continually repeating sequences of memory location accesses simultaneously, and wherein said first and second buses make said first and second continually repeating sequences of memory location accesses available respectively to the first and second data processors simultaneously.

21. The apparatus of claim 17, wherein said second group is a subset of said first group.

22. The apparatus of claim 21, wherein said first bus is adapted for coupling to a third one of the data processors to make said first continually repeating sequence of memory location accesses simultaneously available to the first data processor and the third data processor.

23. The apparatus of claim 22, wherein said second bus is adapted for coupling to a fourth one of the data processors to make said second continually repeating sequence of memory location accesses simultaneously available to the second data processor and the fourth data processor.

24. The apparatus of claim 21, wherein said memory controller is cooperable with said memory independently of the data processors for accessing a third group of the memory locations sequentially and repetitively to produce a third continually repeating sequence of memory location accesses, and including a third bus coupled to said memory and adapted for coupling to a third one of the data processors to make said third continually repeating sequence of memory location accesses available to the third data processor, wherein said third group is a subset of said second group.

25. The apparatus of claim 24, wherein said first bus is adapted for coupling to a fourth one of the data processors to make said first continually repeating sequence of memory location accesses simultaneously available to the first data processor and the fourth data processor.

26. The apparatus of claim 25, wherein said second bus is adapted for coupling to a fifth one of the data processors to make said second continually repeating sequence of memory location accesses simultaneously available to the second data processor and the fifth data processor.

27. The apparatus of claim 21, wherein said memory controller produces said first and second continually repeating sequences of memory location accesses simultaneously, and wherein said first and second buses make said first and second continually repeating sequences of memory location accesses available respectively to the first and second data processors simultaneously.

28. A data processing apparatus, comprising:
a data processor;
a memory having a plurality of memory locations;
a memory controller coupled to said memory and cooperable therewith independently of said data processor for accessing said memory locations sequentially and repetitively to produce a continually repeating sequence of memory location accesses; and
said memory coupled to said data processor to make said continually repeating sequence of memory location accesses available to said data processor.

29. A data processing apparatus, comprising:
first and second data processors;
a memory having a plurality of memory locations;
a memory controller coupled to said memory and cooperable therewith independently of said first and second data processors for accessing a first group of the memory locations sequentially and repetitively to produce a first continually repeating sequence of memory location accesses, and accessing a second group of the memory locations sequentially and repetitively to produce a second continually repeating sequence of memory location accesses;
said memory coupled to said first and second data processors to make said first and second continually repeating sequences of memory location accesses respectively available to said first and second data processors.

30. A data processing apparatus, comprising:
a data processor;
a memory having a plurality of memory locations;
a memory controller coupled to said memory and cooperable therewith independently of said data processor for accessing said memory locations sequentially and repetitively to produce a continually repeating sequence of memory location accesses;
said memory coupled to said data processor to make said continually repeating sequence of memory location accesses available to said data processor; and
a user interface coupled to said data processor to permit user access to said data processor.

31. A data processing apparatus, comprising:
first and second data processors;
a memory having a plurality of memory locations;
a memory controller coupled to said memory and cooperable therewith independently of said first and second data processors for accessing a first group of the memory locations sequentially and repetitively to produce a first continually repeating sequence of memory location accesses, and accessing a second group of the memory locations sequentially and repetitively to produce a second continually repeating sequence of memory location accesses;
said memory coupled to said first and second data processors to make said first and second continually repeating sequences of memory location accesses respectively available to said first and second data processors; and
a user interface coupled to said first data processor to permit user access to said first data processor.

32. A data processing apparatus, comprising:
a data processing portion; and
a memory interface portion coupled to said data processing portion, said memory interface portion configured to interface with a memory apparatus that contains a plurality of memory locations and is operable, independently of said data processing portion and said memory interface portion, to present to said memory interface portion a continually repeating sequence of memory location accesses, and said memory interface portion further configured to make said continually repeating sequence of memory location accesses available to said data processing portion.

33. The apparatus of claim 32, wherein said memory interface portion includes a timing controller configured for temporally tracking said continually repeating sequence of memory location accesses.

34. The apparatus of claim 33, wherein said memory interface portion includes a cache memory coupled to said timing controller and said data processing portion.

35. A method of transferring first and second vectors from a memory apparatus to a data processing apparatus, wherein said first vector includes a first plurality of vector components respectively stored in a first plurality of memory locations in the memory apparatus, and wherein said second vector includes a second plurality of vector components respectively stored in a second plurality of memory locations in the memory apparatus, comprising:
- independently of the data processing apparatus, accessing the first plurality of memory locations sequentially to provide the first plurality of vector components in a first sequence;
- sequentially loading the first vector components of the first sequence into respective data processing elements of the data processing apparatus;
- independently of the data processing apparatus, accessing the second plurality of memory locations sequentially to provide the second plurality of vector components in a second sequence; and
- sequentially loading the second vector components of the second sequence respectively into said data processing elements of the data processing apparatus.

* * * * *